Figure 1:
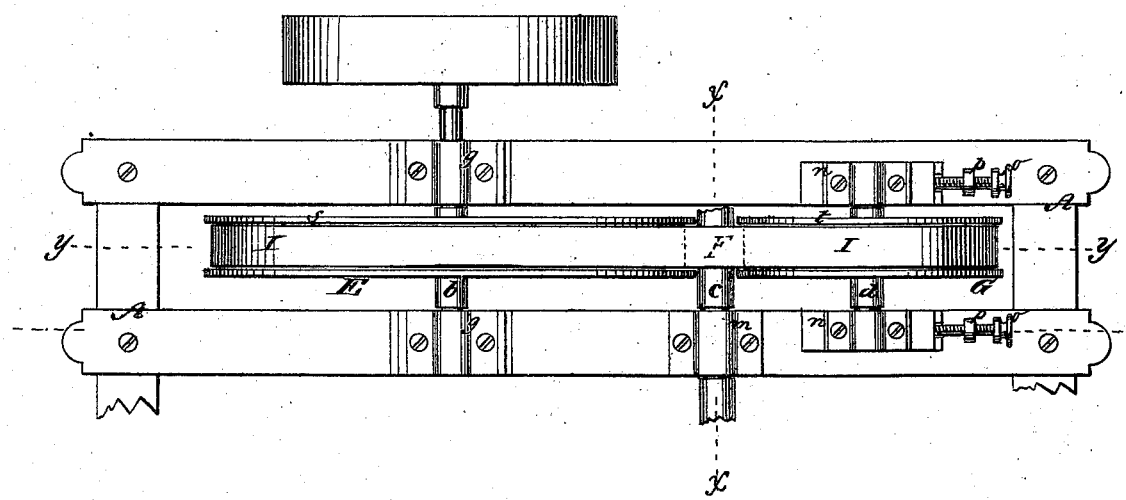

2 Sheets--Sheet 1.

J. RANKIN.
Mechanism for Transmitting Power.

No. 143,640. Patented Oct. 14, 1873.

Witnesses.
E. Wolff.
J. Felbel.

Inventor.
John Rankin.
By his Attorney
J. N. McIntire

J. RANKIN.
Mechanism for Transmitting Power.

No. 143,640. Patented Oct. 14, 1873.

Witnesses.
E. Wolff.
J. Felbel.

Inventor.
John Rankin.
By his attorney
J. N. McIntire

UNITED STATES PATENT OFFICE.

JOHN RANKIN, OF BINGHAMTON, NEW YORK.

IMPROVEMENT IN MECHANISMS FOR TRANSMITTING POWER.

Specification forming part of Letters Patent No. 143,640, dated October 14, 1873; application filed December 11, 1872.

*To all whom it may concern:*

Be it known that I, JOHN RANKIN, of Binghamton, in the State of New York, have invented new and useful Improvements in Mechanism for Transmitting Power; and I do hereby declare that the following is a full and exact description thereof, reference being had to the accompanying drawings making part of this application.

It has been suggested previous to my invention to employ, as a mechanism for transmitting power and motion, two pulleys, having their faces grooved out in a V shape, and banded together by a round belt, and having confined between them a wheel, the face of which was of a convex V shape, and which was driven by the friction of the two grooved pulley-faces. The main object and advantage aimed at by such an arrangement is the holding of the wheel to be driven in equilibrium between the opposite frictional driving-surfaces of the two wheels which serve as drivers, thus relieving the shafting of the usual friction; but this heretofore-suggested plan of driving mechanism does not accomplish the desired objects and advantages because of the serious defect in its principle and mode of operation, resulting from the necessity (in order to prevent the belt from slipping off) of giving to the faces of the pulleys a concave or angular V shape in cross-section, and a corresponding convex wedge shape, in cross-section, to the face of the wheel to be driven, and the consequent conflict of velocities in the different portions of the faces of the wheels which run together.

It is well known that in a system of frictional driving-wheels, or in the use of friction-wheels for conveying power and motion, each wheel must have a flat face, or, in other words, be of the same circumference at all points across its face; otherwise there will be a "slip," and consequent loss of power, unnecessary amount of friction, and unevenness of motion; but it is also well known that, in practice, it is essential to have the faces of pulleys which are belted with the usual flat belt slightly convex in cross-section, to prevent the belt unshipping or running off, and this necessity forces the adoption (in that kind of mechanism where the driven wheel is confined between two drivers) of a shape to the two wheels which is not at all adapted to the purposes of friction-drivers.

I propose to overcome this serious difficulty, and provide a means by which the best possible shape may be given to the faces of the wheels which run in contact, while, at the same time, it shall be impossible for the belt to slip off, thus accomplishing the desired results heretofore not attained in other mechanisms; and to this end my invention consists in a driving mechanism, or a mechanism for the transmission of power, composed of a friction-wheel, mounted on the shaft to be driven, with a perfectly flat or straight face, confined between two or more similarly-shaped driving-wheels, which are provided with annular flanges for the retention of the belt which passes over their peripheries, the whole arranged and operating as will be hereinafter more fully described.

To enable those skilled in the art to make and use my improved mechanism, I will proceed to describe its construction and operation, referring by letters to the accompanying drawings, in which—

Figure 2:
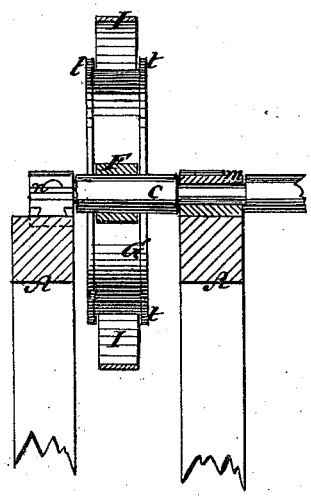
Figure 3:
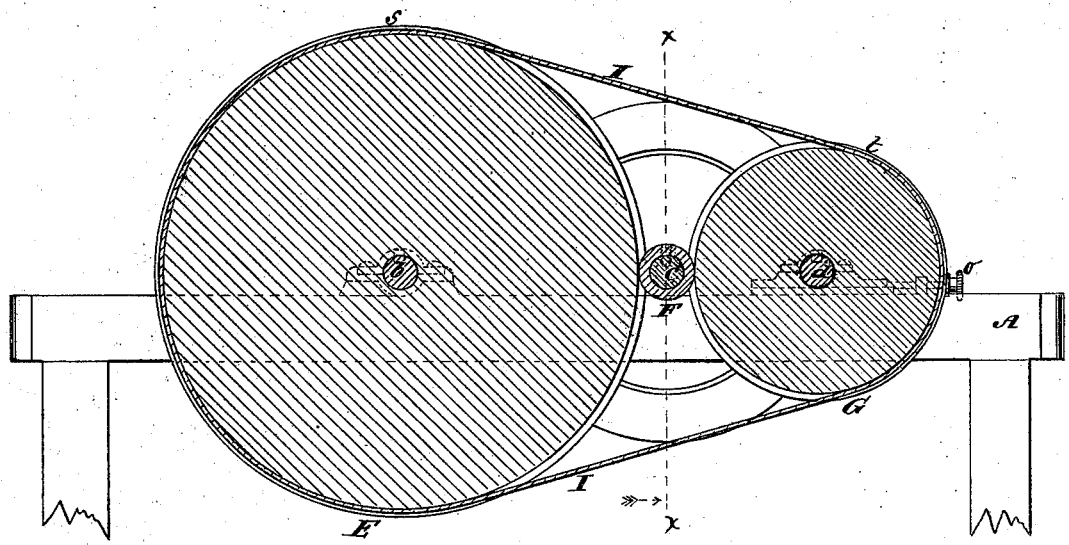
Figure 4:
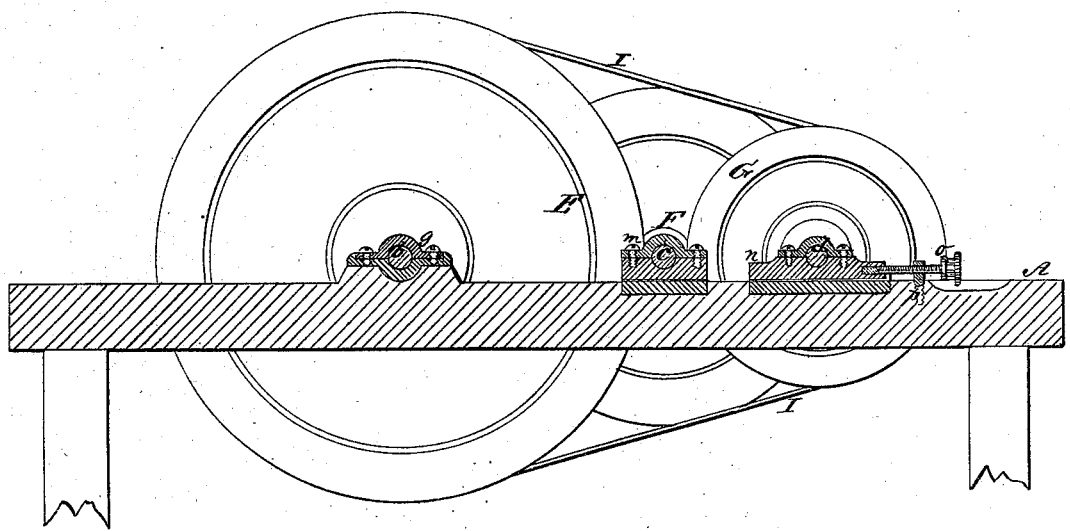

Figure 1 is a top view, Fig. 2 a vertical cross-section at the line $x\,x$, Fig. 1, and Figs. 3 and 4 vertical longitudinal sections at $y\,y$ and $z\,z$ of Fig. 1, of a mechanism constructed and operating in accordance with my invention.

In the several figures the same part will be found designated by the same letter of reference.

A represents any ordinary frame or machine-body for the support of the shafts $b\,c\,d$ of the three wheels E F G, which operate together, as will be presently explained. $b$ is the shaft from which the power is derived, or is the main driving-shaft, and E is consequently the main or first driving-pulley. It is banded to the pulley G by an ordinary flat belt, I, and drives the last-named wheel. The shaft $b$ is hung in stationary or fixed bearing-boxes at $g$; but the shafts $c$ and $d$ are each hung in movable or sliding journal-boxes $m$ and $n$, one of which, $m$, is left free to move horizontally, while the other one, $n$, is held in one direction by set-screws $o$, working in little stands or nuts $p$ attached to the frame A. Where the set-screw $o$ enters the sliding portion of box $n$ there is provided an elastic bearing or cushion, $x$, whereby the screw acts upon the box with a slightly-yielding pressure, for purposes to be presently explained.

The faces of the three wheels, E, F, and G, are all perfectly flat or straight in cross-section, as seen at Fig. 1, so that where the wheels come in contact they touch during the whole width of their faces.

$s$ and $t$ are annular flanges, with which the wheels E and G are provided, and which are employed to retain the belt I in working position, and prevent the possibility of the belt slipping off. These flanges may be either formed on, or attached to, the wheels. They should be such a distance apart, in each wheel, that there shall be no possibility of their coming in contact with the ends of wheel F, to create any unnecessary friction thereon.

The operation is as follows: Motive power being applied to the shaft $b$, the driving-wheel E imparts motion, through the medium of the belt I, to the pulley G of counter-shaft $d$; and these two wheels E and G, by contact of their faces with the face of wheel F, drive the latter by friction. As the pulley G is held toward wheel E by the belt I, and is only prevented from moving bodily toward E—the shaft $d$ being mounted in the sliding boxes $n$—by the interposition of wheel F, and as the shaft $c$ of the last-named wheel is free to move horizontally by virtue of the sliding box $m$, it follows that, by the tension of the belt I, the otherwise free wheel F will be closely confined between the faces of E and G, which, pressing upon diametrically-opposite points in the periphery of F, will cause it to rotate, and thus effect the rotation of the shaft $c$, which is intended to operate any machine or tool desired to be put in motion.

By means of the holding set-screw $o$ the boxes $n$ of shaft $d$ may be set up, more or less, toward shaft $c$, and the wheel G be thus made to press with more or less force against the face of wheel F; and by this arrangement the degree of friction between the faces of the three wheels E, F, and G may be varied and regulated according to the work to be done by, and the velocity to be imparted to, the driven shaft $c$. As without any such device as the screws for holding the boxes $n$ (and where the belt I alone served to hold the wheels in contact) the movable boxes could yield to compensate for any inequalities or slight eccentricities of any or all of the wheels, so in the use of the auxiliary holding set-screw device, an opportunity for this automatic yielding of the shafting and boxes must be provided. This capacity to yield is afforded by having inserted in the cavities where the set-screws $o$ bear against the boxes $n$ slightly-elastic packings $x$, Fig. 4, which, though affording a tolerably-solid abutment for the end of the rigidly-mounted screw $o$, are slightly yielding, so as to permit a movement of the box $n$ under any undue strain caused by any inequalities in the surfaces of the wheels which run in contact.

It will be seen that, by the use, in connection with the belted wheels mounted as shown, of the cushioned set-screw device, the operation of the friction-surfaces may be controlled irrespectively of the tension of the belt, which is a great desideratum, as frequently the tension of the belt, though sufficient to rotate the wheels without slipping, might be such as to require its removal and relacing to make it more taut before it would bind the wheels together with sufficient force to insure the perfect operation of the friction-surfaces. And it will be understood that in my new driving mechanism all the power of the motor may be imparted without any loss of friction, practically, since every point in all the moving-surfaces—both those moved by the belt, and those moved by friction—are moving in perfect unison.

Having so fully explained the construction and operation of my new mechanism for conveying motive power to machinery that any skilled mechanic can make and use my invention, what I claim as new, and desire to secure by Letters Patent, is—

1. The flat-faced, belted, and frictional driving-pulleys, when combined with the wheel to be driven, so as to hold it in equilibrium between the opposing driving-surfaces, and provided with the means described for holding the belt on, the whole constructed to operate substantially as set forth.

2. In combination with the belted and frictional driving-wheels and the interposed wheel to be driven, the cushioned set-screw holding devices, the whole arranged to operate substantially as and for the purpose described.

I testimony whereof I have hereunto set my hand and seal this 14th day of October, 1872.

JOHN RANKIN. [L. S.]

In presence of—
  H. G. RODGERS,
  C. W. GENNET.